Figure 1:
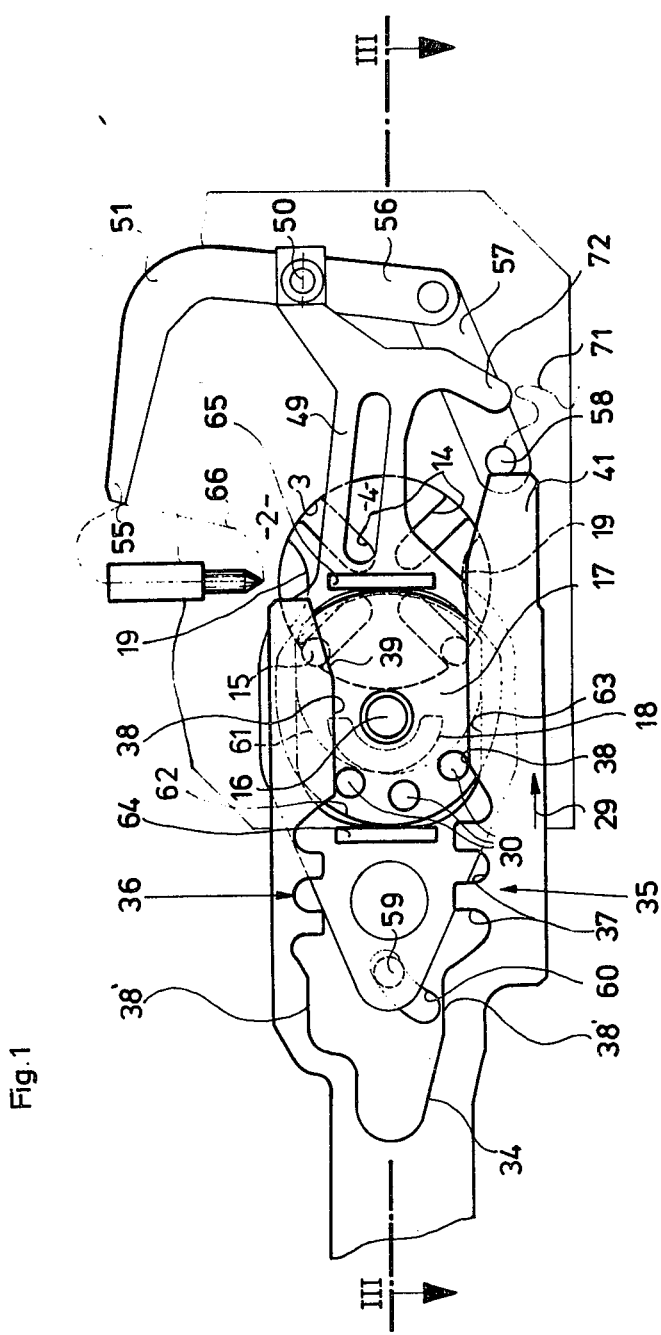

United States Patent [19]

Ketterer et al.

[11] 4,348,941
[45] Sep. 14, 1982

[54] SHOULDER ARM WITH SWIVEL BREECH MEMBER

[75] Inventors: Dieter Ketterer; Horst Jakubaschk, both of Oberndorf; Emil Rommel, Dornhan, all of Fed. Rep. of Germany

[73] Assignee: Heckler & Koch GmbH, Oberndorf, Fed. Rep. of Germany

[21] Appl. No.: 232,970

[22] Filed: Feb. 9, 1981

Related U.S. Application Data

[63] Continuation of Ser. No. 21,314, Mar. 16, 1979, abandoned.

[30] Foreign Application Priority Data

Mar. 30, 1978 [DE] Fed. Rep. of Germany ....... 2813633

[51] Int. Cl.³ .............................................. F41D 10/20
[52] U.S. Cl. ......................................... 89/155; 42/9; 89/33 MC
[58] Field of Search ................... 42/9, 39.5, 60; 89/11, 89/13 R, 13 A, 17, 33 MC, 155, 156, 157

[56] References Cited

U.S. PATENT DOCUMENTS

| 38,772 | 6/1863 | Underwood | 42/9 |
| 3,997,994 | 12/1976 | Kästner et al. | 42/9 |
| 4,004,363 | 1/1977 | Sackenreuter et al. | 42/9 |
| 4,091,711 | 5/1978 | Petersen et al. | 89/13 A |

Primary Examiner—Stephen C. Bentley
Attorney, Agent, or Firm—Spencer & Kaye

[57] ABSTRACT

A shoulder arm, especially a rifle, having a barrel, a recess, which is perpendicular to the axis of the barrel, formed in a member which is fixedly connected with the barrel, and a roller-shaped breech member coaxially arranged in the recess and capable of being swivelled about its longitudinal axis for loading. The breech member contains a firing chamber which, in the firing position of the breech member, is in alignment with the barrel and is closed to the rear. The shoulder arm also has an arrangement for swivelling the breech member out of the firing position and into a loading position, in which the firing chamber is accessible for the introduction of a cartridge. The recess is designed in the form of a cylindrical hole, whose wall serves to mount the roller-shaped breech member and to directly close the firing chamber when it is located in the firing position. The breech member is retained in its respective position by means of the swivelling arrangement which can only rotate the breech member in one direction. A magazine and an ejector, are mounted on the same side of the shoulder arm or weapon and above the barrel.

15 Claims, 3 Drawing Figures

SHOULDER ARM WITH SWIVEL BREECH MEMBER

CROSS REFERENCE TO RELATED APPLICATION

This application is a continuation of Applicants' copending United States application Ser. No. 21,314 filed Mar. 16, 1979, now abandoned.

The present invention relates to a shoulder arm, especially a rifle, having a recess, perpendicular to the axis of the barrel, in a member which is fixedly connected with the barrel, in which recess a roller-shaped breech member is coaxially arranged and capable of being swivelled about its longitudinal axis for loading, the breech member containing a firing chamber which, in the firing position of the breech member, is in alignment with the barrel and is closed to the rear, and having an arrangement for swivelling the breech member out of the firing position and into a loading position, in which the firing chamber is accessible for the introduction of a cartridge, with the recess being designed in the form of a cylindrical hole, whose wall serves to mount the roller serving as the breech member and to directly close the firing chamber when it is located in the firing position, the roller being retained in its respective position by means of the swivelling arrangement.

In this known weapon (German Pat. No. 2,413,615 = U.S. Pat. No. 3,997,994), the design of the swivel breech member and the manner in which it is mounted produce a simple and economical design and there are no moments produced by the gas pressure which could swing the breech member. The breech member itself is designed as a roller having a transverse hole which serves as the firing chamber. The firing and loading positions are separated by a rotation of the breech member amounting to approx. 90°. To eject a cartridge contained in the firing chamber, if the cartridge had not ignited or if the weapon is to be unloaded, for example, the breech member is swivelled into an intermediate position between the loading and firing positions and an ejector, acting on the top of the bullet, is inserted, which ejects the cartridge upwardly at an angle of approx. 45° relative to the axis of the barrel through manual actuation. The swivel motion of the roller is produced by a slide which is slidably mounted in the longitudinal direction of the weapon. The slide has a control slot which is engaged in a positive manner by an eccentric stub arranged on the end of the breech member.

The slide also is employed for actuating a shot counter as well as for actuating a loading lever, which feeds the next cartridge from a magazine when the breech member is in the loading position. Implementation of the entire arrangement, including the ejector, necessitates a large number of individual components, which affects the production costs and the weight of the weapon. It is therefore the object of the present invention to improve the shoulder arm according to the main patent in such a manner as to achieve an ecomonical and weight-saving design of the weapon while ensuring dependable functioning thereof.

According to the present invention, this object is solved in a shoulder arm of the type indicated at the outset in that the breech member can only be rotated in one direction by the swivel arrangement. As a result of this measure it is possible, although this can only be seen upon closer study, to simplify the design of the weapon and to reduce the required number of individual components, and thus the weight of the weapon. In addition, the intermittent rotational motion of the breech member results in a more uniform sequence of motions. And finally, there is also an advantageous improvement with respect to the cartridge ejector, as will be explained below.

In a preferred embodiment of the invention, with the breech member capable of being swivelled into an ejection position which differs from both the loading and firing positions, the ejection position is provided opposite the loading position and the rear end of the firing chamber is free in this position. Thus, in the ejection position the roller-shaped breech member is not located in an intermediate position between loading and firing positions, but is swivelled 180° relative to the loading position. If, as is also provided in the weapon according to the main patent, the magazine is arranged along the top of the barrel, this provides the advantage that the cartridge can be ejected downwardly and there is no longer a risk of the cartridge hitting the shooter's face when it is ejected. This also permits a more practical and, in particular, space-saving arrangement of the ejector, which is arranged on the same side of the barrel as the magazine, thereby eliminating the need to undesirably increase the height of the weapon as a result of arranging magazine and ejector on different sides of the barrel. The ejector can be provided behind the rear end of the magazine in a simple manner, and thereby does not require any interferring additional space, which would force the vertical dimensions of the weapon to be increased.

In an embodiment of the breech member according to the above, it is swivelled 90° from the loading position to the firing position. It is then swivelled on in the same direction, either to the ejection position, if a cartridge is to be ejected, or an additional 180° into the loading position again. However the sequence of motions of the roller-shaped breech member is relatively irregular, as a swivel motion of 90° always alternates with a swivel motion of 270° during the course of normal firing. In order to combat this irregularity of the swivel angle, in an especially preferred embodiment of the invention the firing chamber in the breech mamber is designed symmetrically to a transverse center plane and is capable of assuming two firing positions, separated one from the other by a 180° rotation of the breech member. The advantage of this embodiment is that every rotary motion of the breech member represents a swivel angle of approx. 90°. From the loading position, the breech member is swivelled 90° into the firing position. After the shot has been fired, it swivels an additional 90°, whereupon the opposite end of the firing chamber is located in the loading position. Should the cartridge have failed to fire, the next following cartridge forces the malfunctioning cartridge downward out of the firing chamber when it is introduced ino the firing chamber and the weapon is again ready to fire after the breech member has swivelled on 90°. This design of the weapon results in a highly uniform, and thus gentle, sequence of motions and permits a high cadence to be achieved. The weapon can be employed for firing both case-type and caseless ammunition. When firing case-type ammunition, the new cartridge being fed to the firing chamber must eject the case of the fired cartridge each time, either directly or by means of an intermediate member provided in the breech member. However the weapon according to the present invention displays its particular advantages when firing caseless ammunition.

As already mentioned, the swivel angle of the breech member between loading and firing positions should be 90°. However, if necessitated as a result of design conditions, it is also possible to increase or decrease this angle slightly. However with symmetrical design of the firing chamber, the swivel angle of the breech member between two loading operations is always 180°.

As already mentioned, it is preferable to arrange ejector and magazine on the same side of the weapon, in particular above the barrel, as is already provided for with respect to the magazine in the case of the weapon according to the in the U.S. patent cited above. In preferred further embodiments of the invention, the loading end, which introduces the cartridges into the firing chamber in the breech member, of a loading lever acts outside the center of the cartridge and leaves the center of the cartridge free, and an ejector is arranged on the center plane and swivels into an attitude, under the force of a spring, in which it is located opposite the firing chamber should there be no cartridge. Should there be no cartridge, either because the magazine is empty or has been removed, the ejector is located opposite the firing chamber and can downwardly eject a cartridge contained in the firing chamber. If the cartridge in the firing chamber has failed to fire, the next cartridge fed acts as an ejector and ejects the cartridge still located in the firing chamber downward. The ejector can be introduced into the firing chamber via a Bowden wire, by means of a manually actuated cocking arrangement.

The drive means of the breech member can be designed in differing manners and can be solved in accordance with different design measures. In a preferred embodiment of the invention, a Geneva movement is provided at at least one end of the breech member as a swivel arrangement. Geneva movements offer advantageous sequences of motion and acceleration and are known in the art in a wide variety of designs. Preferably, it comprises four radial slots in the end of the breech member, in which the pins of a cam engage, the pins being arranged in a projecting manner on one end, with the cam of the swivel arrangement being capable of being rotated 360° by drive means during one firing cycle. A 360° rotation of the cam results in a 180° rotation of the breech member.

In order to be able to dependably and precisely locate the breech member in both the firing position as well as in the loading position and/or in the firing position until the loading operation has been completed or the shot has been fired, in preferred embodiments of the invention the breech member has recesses in the perimeter area, in the plane of the Geneva movement slots, and a dog, which engages the recesses, is provided on the cam, with the effective contour of the dog being concentric relative to the axis of rotation of the cam. The arrangement between pins and dog is selected in such a manner that either the pins or the dog engage the Geneva movement slots or the recesses at all times, thereby always ensuring a dependable association between the angles of the cam and the breech member, as the association is of a positive nature.

Like the weapon according to the U.S. patent cited above, the weapon according to the present invention is preferably designed as a gas operated weapon, whose gas piston produces the motions. In a preferred embodiment of the invention, the gas piston actuates a control slide against the force of a spring, and the control slide has two toothings, which alternately engage corresponding projections on the cam during the forward and rearward travel of the control slide, swivelling the cam 180° in each case. Swivelling the cam 180° causes the breech member to swivel the desired 90°. During a portion of the motion of the control slide, the cam swivels the breech member until the pins of the cam engage the Geneva movement slots. During the other portion of the motion of the control slide and the cam, the breech member is arrested, i.e. when the dog rotates in the recess in the breech member. This design ensures the ability to withstand high stresses, as only relatively low surface pressures occur, and thus a high degree of wear resistance, while simultaneously offering precise arresting of the breech member in the loading and firing positions.

In preferred embodiments of the invention, the projections are designed as an axial group of bolts with at least two, but preferably three, bolts being provided on the end of the cam opposite the pins and dog. The opposite toothings of the control slide are followed by straight flanks or edges, which extend in the direction of travel of the control slide and, with whom the bolts come into a contacting relationship after disengaging from the toothings in order to prevent further rotation of the cam in a positive manner. This provides the advantage that the motion of the control slide can be as long as desired and that the functioning of the arrangement does not depend upon the amplitude of the motion of the control slide as long as the amplitude has only a certain minimum magnitude, i.e. as long as the bolts travel the full length of the toothing. This permits the motion of the control slide to be absorbed in a resilient manner, without impairing the functioning of the arrangement in any manner. Through their contacting relationship with the flanks or edges of the control slide being guided, the bolts locate the respective position of the breech member.

The drive means of the loading lever can be designed in various manners. Generally, the loading lever is provided with a catch and performs a swivel motion. The catch is required as that end of the loading lever on the cartridge side extends beyond the cross sectional area of the cartridge when the cartridge is introduced into the firing chamber, however the next cartridge can already be located in this location during the rearward travel. However a catch of this nature, including its mounts and required spring, represents an additional expenditure and an additional source of malfunctioning. It is therefore desired to have that end of the loading lever on the cartridge side perform a coupler curve having a straight portion for insertion of the cartridge into the firing chamber, followed by portions which are generally perpendicular thereto and connected one with the other in an arc. In order to be able to implement this, in a preferred embodiment of the invention the cam, which is rotatable about an axle which is fixed to the barrel, engages a recess in a control lever, one end of which is pivoted to a loading lever designed as a toggle lever. In a further embodiment, the cam has two axially staggered outer contours, one engaging a recess, the other engaging a ridge on the control lever, designed as a flat plate; with an arrangement of this nature, it is possible to achieve the desired coupler curve. In order to make the coupler curve more favourable, that end of the control lever which faces away from the loading lever is slidably mounted in a groove which is fixed to the barrel and inclined relative to the axis of the barrel, whereby the cam forces that end of the control lever on the loading lever side to perform a coupler curve motion.

The contacting relationship of the control lever with the cam can be produced by means of springs. However springs of this nature require additional space and can break, which would impair the dependability of the weapon. In preferred embodiments of the invention, the contours of the cam are therefore designed in the form of constant-diameter camming contours, which are always in a contacting relationship with two opposite and parallel edges of the control lever, and the two pairs of edges are arranged generally perpendicular one to the other. Constant-diameter camming contours of this nature are known; they are characterized by the fact that mutually parallel tangents maintain a constant clearance against the contour when the constant-diameter camming surface is rotated. Thus, this produces a positive, and thus dependable and secure motion. As a result of the two pairs of edges, which are generally perpendicular one to the other, formed by the recess in the control lever, on the one hand, and by ridges provided thereon, on the other hand, the control lever is guided and movable in a positive manner in all directions in its plane, with a clear and constantly reproduceable motion for producing the coupler curve of the loading lever resulting, together with being mounted in the inclined groove.

Preferably, the swivel arrangement for the breech member consists of two arrangements of control slides, control lever and cam, arranged symmetrically on both sides of the breech member.

Figure 2:
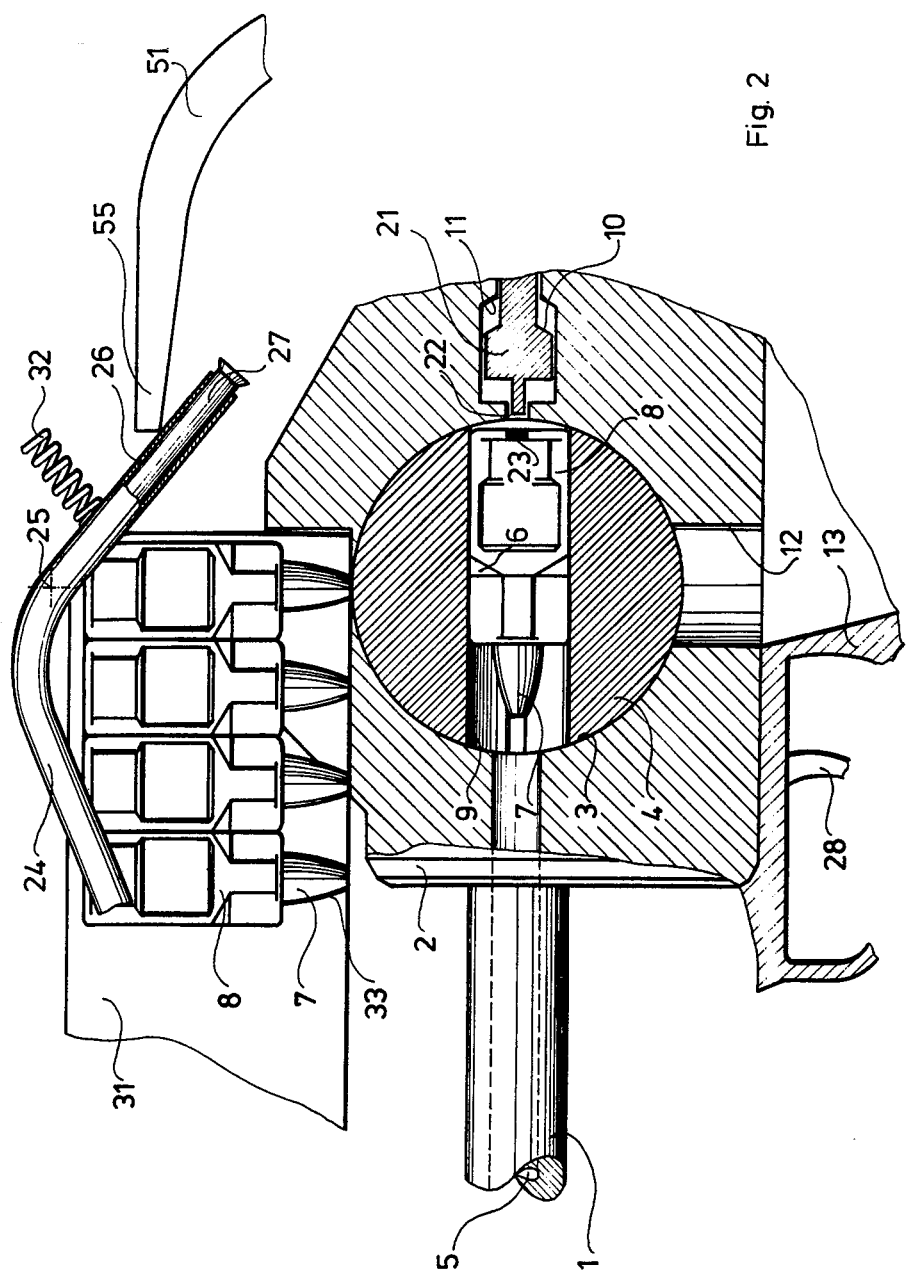
Figure 3:
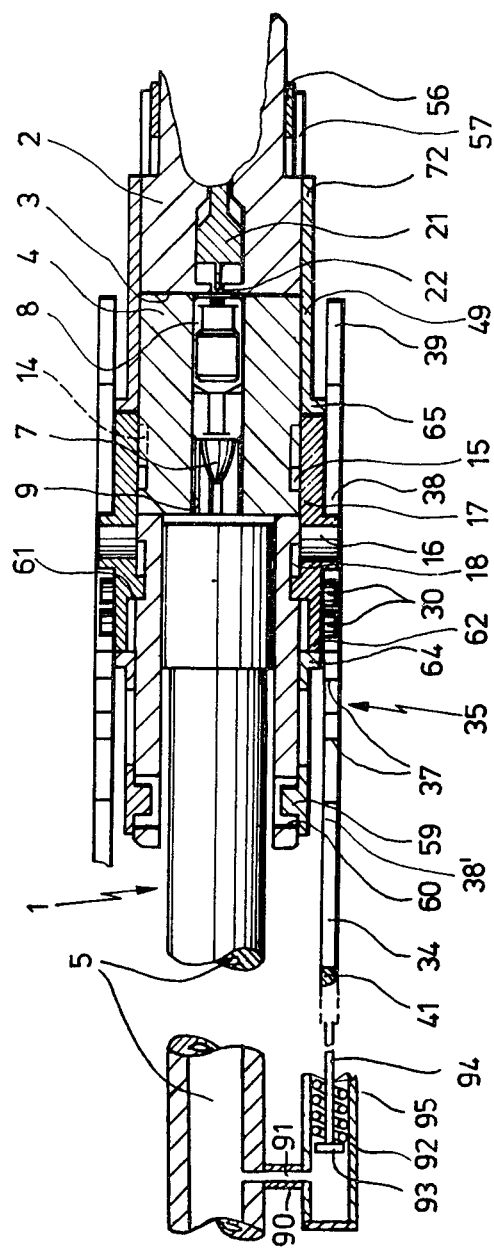

The above discussed and other objects, features, advantages and embodiments of the present invention will become more apparent from the following description thereof, when taken in connection with the practical example shown in the accompanying drawings. The features contained in the description and drawings may be employed in other embodiments individually or in any desired combination. In the drawings, FIG. 1 shows the parts of an automatic rifle of significance for the invention, as a side view;

FIG. 2 shows, partially as a view and partially as a longitudinal section taken along the center, the breech member and the adjacent components of the rifle shown in FIG. 1 in a plane parallel to the representation shown in FIG. 1; and FIG. 3 shows a section taken along Line III—III in FIG. 1.

Referring now to the drawings, wherein like reference numerals designate like parts throughout the several views, the practical example shown therein is an automatic rifle equipped for firing caseless cartridges. Located in a member 2 which is fixedly attached to the barrel 1 is a cylindrical hole 3, whose axis extends perpendicular to the axis of the barrel 1 and intersects said axis of the barrel. Mounted in this hole 3 is a roller-shaped breech member 4, which can be pivoted about the axis of hole 3. This breech member is illustrated in the firing position in the drawing. In this firing position, a firing chamber 9 arranged in the breech member 4 is in alignment with the bore 5 of barrel 1. The firing chamber 9 is designed symmetrically to a transverse center plane of the rifle, from which the axis of barrel 1 extends in a perpendicular manner and on which the axis of breech member 4 is located. A caseless cartridge located in firing chamber 9 comprises a propellant body 8, with a bullet 7 projecting from the end thereof. Provided in firing chamber 9, which has a generally rectangular inside cross sectional area, on both sides of the above-mentioned transverse center plane are support surfaces, against which corresponding mating surfaces 6 of propellant body 8 come into a supporting relationship; the above mentioned supporting surfaces thereby define the attitude of cartridge 7, 8 in firing chamber 9. The firing chamber is symmetrical to a plane which is perpendicular to the axis of bore 5 and on which the axis of breech member 4 is located.

Mounted in a hole 22 in member 2, on that side of hole 3 located opposite bore 5, is a firing pin; hole 22 extends in alignment with bore 5. Firing pin 21 has a support shoulder 10 on the side facing away from firing chamber 9. After ignition of propellant body 8, support shoulder 10 comes into a contacting relationship with a support surface 11 in hole 22, which is formed by a constriction of hole 22, to provide sealing. If case-type cartridges are employed instead of caseless cartridges, the cartridge then provides the sealing effect and support shoulder 10 and support surface 11 are not required. Firing pin 21 normally assumes the position shown in FIG. 2, in which its front end, which acts on a priming compound 23 when a shot is fired, does not penetrate the envelope of hole 3. To ingite a cartridge, firing pin 21 is struck forward by an unillustrated hammer, which acts conjointly with elements of a trigger mechanism in the usual manner and which is actuated by a trigger 28.

For loading the weapon, breech member 4 can be swivelled 90° into a loading position, in which firing chamber 9 is located perpendicular to the axis of bore 5 and one of the open ends of the firing chamber faces upward toward a magazine 31, which is arranged above barrel 1 of the weapon and extends parallel to said barrel. Magazine 31 is a box-type magazine in which cartridges 7, 8 are arranged in such a manner that they are perpendicular to the direction of fire, with the tips 33 of the bullets 7 pointing toward the axis of the barrel. With breech member 4 in the loading position, the respective forwardmost cartridge 7, 8 (rearwardmost in the direction of fire) is aligned with firing chamber 9 in breech member 4. On the opposite side from magazine 31, member 2, into which hole 3 opens, contains a well 12, which opens downward into a hollow pistol grip 13 of the rifle.

A Bowden wire 24 extends from an unillustrated cocking lever to that end of magazine 31 located adjacent to breech member 4, where Bowden wire 24 becomes a sleeve 26, which can be pivoted about an axle 25 located parallel to the axis of hole 3, with an ejector bolt 27 being slidably located in sleeve 26. Sleeve 26 is subject to the effect of a compression spring 32, under whose effect it is held in a contacting relationship with the respective cartridge 7, 8 located at the end of magazine 31. Should there be no cartridge in magazine 31 or if magazine 31 has been removed, compression spring 32 swivels sleeve 26 into an attitude in which it is in alignment with firing chamber 9, if firing chamber 9 is located in the loading position. Actuation of the cocking lever operates ejector bolt 27 by means of Bowden wire 24, which ejects a cartridge located in firing chamber 9 downward through well 12. Should a cartridge still be located in firing chamber 9 when the next cartridge is chambered from magazine 31, this cartridge forces the cartridge still located in firing chamber 9 out of the firing chamber, with bullet tip 33 contacting bullet tip 33.

Breech member 4 is swivelled by means of a control slide 41, which is slidably mounted in the longitudinal direction of the weapon and which is connected with known drive means, actuated by means of the gas pressure, via a rod. For example, as shown in FIG. 3, the gas operated drive means may include a connection 90 having a base 91 which connects the interior of base 5 with the interior of a cylinder 92. Displaceably guided in the cylinder 92 is a piston 93 having a piston rod 94 which is connected with the control slide 41. A recoil spring 95 disposed in the cylinder 92 moves the piston 93 to its illustrated end position. When a bullet is fired, the pressure in the barrel 5 reaches the cylinder 92 after the bullet has passed beyond the base 91 and this pressure moves the piston 93, and thus, via the piston rod 94, the control slide 41 in the direction of arrow 29. The slide 41 is moved in the opposite or return direction by means of the recoil spring 95 which was compressed during movement of piston 93 by the gas pressure.

The end of control slide 41 facing away from the muzzle of barrel 1 has a longitudinal recess 34, whose contour includes two areas of toothing 35 and 36, arranged generally one opposite the other, with each toothing consisting of three recesses 37. Provided behind toothing 35 and 36 are flanks 38, located parallel one to the other, which become inclined surfaces 39, widening in a wedge-like manner, at the ends facing away from barrel 1.

Breech member 4 is also driven by a Geneva movement, which comprises slots 14, which are machined into at least one end of roller-shaped breech member 4, which are radially arranged and which open into the envelope surface. Slots 14 are staggered 90° relative to one another. Two pins 15 engage slots 14 alternately; pins 15 can be pivoted about an axle 16, which is stationary relative to member 2 and which extends parallel to the axis of hole 3. Pins 15 are arranged at one end of a cam 17, which, in addition to pins 15, also carries a dog 18, which is concentric relative to axle 16. Dog 18 is designed in the shape of a semicircular arc. One recess 19 is machined between every two slots 14 in the end of breech member 4; recesses 19 are arranged one opposite the other, with the base of the recess having a semicircular contour, whose curvature is identical to the curvature of dog 18. When breech member 4 is swivelled 90° out of the attitude illustrated in FIG. 1, dog 18 engages one of the two recesses 19, with breech member 4 in the loading position. Thus, at any given time the angle of breech member 4 is always precisely defined and positively secured by pins 15 or dog 18.

Pins 15 and dog 18 are located on that end of cam 17 which faces the center of the weapon. Three bolts 30 are provided on that end of cam 17 which faces outward, in the approximate area of dog 18. Bolts 30 are located in the plane of control slide 41; in the firing position illustrated in FIG. 1, the two outer bolts 30, which are located at a greater distance from axle 16 than the center bolt 30 located between them, are each in a contacting relationship with one of the two parallel edges 38 of control slide 41, thereby preventing cam 17, and thus breech member 4, from rotating.

When a shot is fired, the gas pressure acts on the gas operating mechanism, which thereupon moves control slide 41 in the direction of arrow 29. The three bolts 30 engage the three recesses 37 in toothing 35 one after another, thereby causing cam 17 to swivel 180°, until bolts 30 are in a contacting relationship with parallel edges 38', which follow on the other end of toothing 35 and 36, again preventing further rotation of cam 17 and breech member 4. During this 180° rotation of cam 17, one of pins 15 drives breech member 4 90° until, prior to the termination of the rotation of cam 17, dog 18 engages recess 19, which prevents breech member 4 from rotating during the remaining rotary motion of cam 17. Thus, the loading position is attained, in which the longitudinal direction of firing chamber 9 extends perpendicular to the axis of barrel 1. A loading lever 51, whose arrangement and function are described below, pushes the next cartridge 7, 8 out of magazine 31 and into firing chamber 9 by means of its fork-shaped loading end 55, which surrounds sleeve 26.

When the bullet has left the barrel and the gas pressure has declined, the recoil spring 95 forces control slide 41 forward, opposite the direction of arrow 29. The three bolts 30 then engage recesses 37 of toothing 36 one after the other, thereby rotating cam 17 an additional 180° into the position illustrated in FIG. 1 again. During the first portion of this rotary motion of cam 17, dog 18 is still located in recess 19, and breech member 4 does not rotate. Dog 18 then disengages from recess 19, and one of pins 15 engages the next slot 14, driving breech member 4 until the illustrated position has been reached, in which both pins 15 are located in the outer radial area of slots 14. Following this renewed 90° rotation, breech member 4 is again located in the firing position.

Loading lever 51 is designed as an angle lever, with a control lever 49 being pivotally arranged about an axle 50, which is parallel to the axis of hole 3, in the vicinity of the angle. Pivoted to the end of the same arm 56 of loading lever 51 is a guide rod 57, whose other end can be pivoted about a stationary axle 58 on member 2. Guide rod 57 and loading lever 51 therefore form a toggle joint. Formed to control lever 49 in the vicinity of guide rod 57 is a short arm 72, which is employed for indexing a toothed wheel 71 of an unillustrated shot counter.

On the end opposite loading lever 51, control lever 49 has a lateral nose 59, which engages a groove 60 machined in member 2, with groove 60 assuming an acute angle of approx. 30° to 40° relative to the axis of the barrel 1.

Control lever 49 is moved positively by cam 17, both in the direction of barrel 1 and laterally thereto. For this purpose, cam 17 has two constant-diameter camming contours 61 and 62. Constant-diameter camming contour 61 is located in the plane of control lever 49, generally designed in the form of a flat plate, which has a recess 63 for this purpose, having the contours of a rectangle with strongly rounded corners, with the long side of the rectangle being generally parallel to the longitudinal axis of the weapon. Also formed to control lever 49 are two ridges 64 and 65, which are located in the plane of constant-diameter camming contour 62 and which extend perpendicular to the longitudinal direction of rectangular recess 63. It is a characteristic of constant-diameter camming contours 61 and 62 that two tangents, parallel one to the other, which are placed against constant-diameter camming contours 61 and 62 will have the same clearance, one from the other, everywhere.

The two longitudinal sides of the rectangle forming recess 63 have the same clearance, one from the other, as the clearance between the two tangents at constant-diameter camming contour 61, while the two ridges 64 and 65 are tangents to constant-diameter camming contour 62. Thus, by rotating cam 17 with the two constant-diameter camming contours 61 and 62, control lever 49 can be shifted in its plane both in the longitudinal direction of the weapon as well as laterally thereto (whereby the control lever would be able to be pivoted about cam 17 if it were not pivoted to axle 50 and without the guidance of 59 and 60). The shift in the longitudinal direction of the weapon is caused by constant-diameter camming contour 62, which is in a contacting relationship with ridges 64 and 65, while the upward and downward shift is caused by constant-diameter camming contour 61, which is in a contacting relationship with recess 63. With the additional correction provided by the swivel motion of control lever 49, which is produced in the opposite direction by nose 59 in groove 60, the two constant-diameter camming contours 61 and 62 produce a coupler curve of loading end 55 of loading lever 51, indicated as dash-dotted coupler curve 66 in FIG. 1. When a shot is fired, loading end 55 is located at about one half its maximum height. As control slide 41 moves to the rear, loading end 55 moves upward. As soon as breech member 4 has stopped and no longer rotates, while cam 17, and thus constant-diameter camming contours 61 and 62, continue to rotate, loading end 55 moves forward, in the direction of fire, to a position above the rear, upper end of propellant body 8 of cartridge 7, 8, which is now located opposite firing chamber 9 in breech member 4. During the remaining rotary motion of cam 17, during the rearward motion of control slide 41, loading end 55 moves downward, virtually in a straight line, in the direction of breech member 4 and slides in the cartridge. The remainder of the cartridge-insertion motion, all the way to the lowest position of loading end 55, is performed at the beginning of the forward travel of control slide 41, when cam 17 is already rotating but breech member 4 is arrested by dog 18, which still engages recess 19. At the beginning of the rotary motion of breech member 4, loading end 55 begins to move away, to the rear, from the opening of the firing chamber, and stops at about one third to one half of the upward motion of coupler curve 66, when control slide 41 assumes its forward position.

Since the axis of firing chamber 9 intersects the axis of the roller forming breech member 4, the forces that occur as a result of the gas pressure when a cartridge 7, 8 is fired act symmetrically on breech member 4, so that no torques whatsoever are formed and no significant force is required for retaining the breech member 4. Consequently, no complicated locking features are required for the breech member. Since the loading position is also the ejection position, breech member 4 can be arranged in such a manner that it rotates in a uniform direction and ejector 26, 27 can be arranged on the same side of barrel 1 as magazine 31, thereby also permitting downward ejection through well 12. Thus, the avoidance of an intermediate position of the breech member 4 between the firing position and the loading position provides a number of advantages. The illustrated and described arrangement of control slide 41, control lever 49 and cam 17 results in dependable functioning, which is not dependent on the amplitude of the motion of the control slide, if only a minimum travel stroke is maintained, as the stroke sections in which bolts 30 are in a contacting relationship with parallel edges 38 and 38' do not have any influence on the operation of the breech.

Obviously, many modifications and variations of the present invention are possible in the light of the above teachings. It should therefore be understood that within the scope of the appended claims, the invention may be practiced otherwise than as specifically described.

Having thus fully disclosed our invention, what we claim is:

1. In a shoulder arm, especially a rifle, having a barrel, a recess, extending perpendicular to the axis of said barrel, formed in a member which is fixedly connected with said barrel, and a roller-shaped breech member coaxially arranged in said recess and capable of being swivelled about its longitudinal axis for loading, said breech member containing a firing chamber which is designed symmetrically to a transverse center plane and is capable of assuming two firing positions separated from one another by a 180° rotation of said breech member and which, in each said firing position of said breech member, is in alignment with said barrel and is closed to the rear, and further having an arrangement for swivelling said breech member out of said firing positions and into a loading position in which said firing chamber is accessible for the introduction of a cartridge; and wherein said recess is designed in the form of a cylindrical hole whose wall serves to mount said roller-shaped breech member and to directly close said firing chamber when it is located in said firing position, said breech member is retained in its respective position by means of said swivelling arrangement, and said breech member can only be rotated in one direction by said swivel arrangement; the improvement wherein: an ejector and a magazine are arranged on the same side of the weapon, above said barrel, and in an operative position with said firing chamber when it is in said loading position; the loading end, which introduces the cartridges into said firing chamber in the breech member, of a loading lever acts outside the center of the cartridge and leaves said center of the cartridge free; said ejector is arranged in the center plane and swivels into an attitude, under the force of a spring, in which it is located opposite said firing chamber should there be no cartridge.

2. The shoulder arm set forth in claim 1, in which said ejector can be introduced into said firing chamber, via a Bowden wire, by means of a manually actuated cocking arrangement.

3. In a shoulder arm, especially a rifle, having a barrel, a recess, extending perpendicular to the axis of said barrel, formed in a member which is fixedly connected with said barrel, and a roller-shaped breech member coaxially arranged in said recess and capable of being swivelled about its longitudinal axis for loading, said breech member containing a firing chamber which is designed symmetrically to a transverse center plane and is capable of assuming two firing positions separated from one another by a 180° rotation of said breech member and which, in each said firing position of said breech member, is in alignment with said barrel and is closed to the rear, and further having an arrangement for swivelling said breech member out of said firing positions and into a loading position in which said firing chamber is accessible for the introduction of a cartridge; and wherein said recess is designed in the form of a cylindrical hole whose wall serves to mount said roller-shaped breech member and to directly close said firing chamber when it is located in said firing position, said breech member is retained in its respective position by means of said swivelling arrangement, and said breech member can only be rotated in one direction by said swivel arrangement; the improvement wherein an ejector and a magazine are arranged on the same side of the weapon, above said barrel, and in an operative position with said firing chamber when it is in said loading position; and wherein said swivel arrangement includes: a Geneva movement provided at at least one end surface of said breech member, said Geneva movement comprising four radial slots formed in the end surface of said breech member and in which the pins of a cam engage with said pins being arranged in a projecting manner on one end of said cam; and gas power operated drive means for rotating said cam 360° during one firing cycle, said gas power operated drive means including a gas piston which actuates a control slide against the force of a spring, said control slide having two toothings which engage alternately with corresponding projections in said cam during the forward and rearward travel of said control slide, thereby swivelling said cam 180° in each case.

4. The shoulder arm set forth in claim 3, in which said projections are designed as an axial group of bolts, consisting of at least two, however preferably three bolts provided on that end of the cam located opposite the pin and dog, and in which the toothings on the control slide, located one opposite the other, are followed by straight edges, against which said bolts are located in a contacting relationship after disengagement with the toothing in order to prevent further rotation of the cam in a positive manner.

5. The shoulder arm set forth in claim 4, in which the distance between the centers of the two outer bolts is as great as the clearance between the parallel edges, less the diameter of one bolt.

6. The shoulder arm set forth in claim 3, in which said cam, which can be rotated about an axle which is rigidly connected with the barrel, engages a recess in a control lever, one end of said lever being pivoted to a loading lever designed as an angle lever.

7. The shoulder arm set forth in claim 6, in which said cam has two axially staggered outer contours, one engaging a recess, the other engaging a ridge on the control lever, designed as a flat plate, in which that end of the control lever which faces away from the loading lever is slidably mounted in a groove which is fixed to the barrel and inclined relative to the axis of the barrel, and in which the cam forces that end of the control lever on the loading lever side to perform a coupler curve motion.

8. The shoulder arm set forth in claim 7, in which the contours of the cam are designed in the form of constant-diameter camming contours, which are always in a contacting relationship with two opposite and parallel edges of the control lever, and in which the two pairs of edges are arranged generally perpendicular one to the other.

9. The shoulder arm set forth in claim 6, in which the swivel arrangement for the breech member consists of two arrangements of control slides, control lever and cam, arranged symmetrically on both sides of the breech member.

10. In a shoulder arm, especially a rifle, having a barrel, a recess, extending perpendicular to the axis of said barrel, formed in a member which is fixedly connected with said barrel, and a roller-shaped breech member coaxially arranged in said recess and capable of being swivelled about its longitudinal axis for loading, said breech member containing a firing chamber which is designed symmetrically to a transverse center plane and is capable of assuming two firing positions separated from one another by a 180° rotation of said breech member and which, in each said firing position of said breech member, is in alignment with said barrel and is closed to the rear, and further having an arrangement for swivelling said breech member out of said firing positions and into a loading position in which said firing chamber is accessible for the introduction of a cartridge; and wherein said recess is designed in the form of a cylindrical hole whose well serves to mount said roller-shaped breech member and to directly close said firing chamber when it is located in said firing position, said breech member is retained in its respective position by means of said swivelling arrangement, and said breech member can only be rotated in one direction by said swivel arrangement; the improvement wherein an ejector and a magazine are arranged on the same side of the weapon, above said barrel, and in an operative position with said firing chamber when it is in said loading position; wherein any cartridge remaining in said firing chamber when it is in said loading position will be ejected from said firing chamber by the next cartridge fed to said firing chamber from said magazine; and further comprising means for mounting said ejector relative to said magazine so that said ejector is operable to enter said firing chamber when it is in said loading position to eject a cartridge only if no cartridge is available for loading into said firing chamber.

11. The shoulder arm set forth in claim 10, with the breech member capable of being swivelled into an ejection position which differs from both the loading and firing positions, in which the ejection position is provided opposite the loading position and the rear end of said firing chamber is free in this position.

12. The shoulder arm set forth in claim 10, in which the swivel angle of said breech member between the loading and firing positions is 90°.

13. The shoulder arm set forth in claim 10 in which said swivel arrangement includes: a Geneva movement provided at at least one end surface of said breech member; said Geneva movement comprising four radial slots in the end surface of said breech member, in which slots the pins of a cam engage, with said pins being arranged in a projecting manner on one end of said cam; and gas power operated drive means for rotating said cam 360° during one firing cycle.

14. The shoulder arm set forth in claim 13, in which arc-shaped recesses for each loading position are provided in the perimeter area of the breech member, in the plane of the Geneva movement slots, and in which a dog, which engages a recess, is provided on the cam, the effective contour of said dog being concentric relative to the axis of rotation of said cam, and in which either at least one of the pins or the dog is always in engagement with the Geneva movement slots or one of the recesses.

15. The shoulder arm set forth in claim 12 or 10 wherein said firing chamber is designed for use with caseless ammunition.

* * * * *